(12) United States Patent
Osburn, III

(10) Patent No.: US 7,587,481 B1
(45) Date of Patent: *Sep. 8, 2009

(54) ENTERPRISE SERVER FOR SCADA SYSTEM WITH SECURITY INTERFACE

(75) Inventor: Douglas C. Osburn, III, Houston, TX (US)

(73) Assignee: DJ Inventions, LLC, Houston, TX (US)

( * ) Notice: Subject to any disclaimer, the term of this patent is extended or adjusted under 35 U.S.C. 154(b) by 978 days.

This patent is subject to a terminal disclaimer.

(21) Appl. No.: 11/050,170

(22) Filed: Feb. 3, 2005

Related U.S. Application Data

(63) Continuation-in-part of application No. 09/826,578, filed on Apr. 5, 2001, now Pat. No. 6,950,851.

(51) Int. Cl.
*G06F 15/173* (2006.01)
*G06F 15/16* (2006.01)

(52) U.S. Cl. .................. 709/223; 709/203; 709/227

(58) Field of Classification Search ......... 709/202–203, 709/223–224, 227–230
See application file for complete search history.

(56) References Cited

U.S. PATENT DOCUMENTS

| 5,794,009 | A | 8/1998 | Coleman | 709/227 |
|---|---|---|---|---|
| 6,032,154 | A | 2/2000 | Coleman | 707/104.1 |
| 6,411,987 | B1 | 6/2002 | Steger | 709/203 |
| 6,628,992 | B2 | 9/2003 | Osburn | 700/9 |
| 6,751,562 | B1 | 6/2004 | Blackett | 702/61 |
| 6,950,851 | B2 * | 9/2005 | Osburn, III | 709/203 |
| 7,246,156 | B2 * | 7/2007 | Ginter et al. | 709/224 |

* cited by examiner

*Primary Examiner*—Bharat N Barot
(74) *Attorney, Agent, or Firm*—Buskop Law Group, PC; Wendy Buskop

(57) ABSTRACT

An embodiment of this invention is a system for communication for a supervisory control and data acquisition (SCADA) system. The SCADA system includes, an enterprise server, and an intelligent electronic device (RTU). The RTU measures a physical process and stores data in memory area for transmission. A communication software (AES) links the enterprise server with the RTU. The SCADA system includes a configuration software (ARME) with which a RTU can be reconfigured. A configurable security interface can be integrated into the AES, wherein the security interface includes, encrypting data from RTU and AES using an encryption software. The encryption software can be Transport layer security, Secure Socket Layer. An example of encryption usable in the invention can be model TECSEC of Vienna, Va. The encryption software authenticates communications between an authorized RTU and AES and is also available form TECSEC.

20 Claims, 5 Drawing Sheets

ENTERPRISE SERVER FOR SCADA SYSTEM WITH SECURITY INTERFACE

The present application is a continuation-in-part application, which claims priority to co-pending patent application Ser. No. 09/826,578 filed in the U.S. Patent and Trademark Office on Apr. 5, 2001.

FIELD

The present invention relates to an enterprise server for an integrated automation system that has utility in the refining, petrochemical and chemical processing industries as well as the oil and gas production industry, metal manufacturing industry, maritime drilling businesses and environmental monitoring.

BACKGROUND

The automation industry has had major developments in the implementation of SCADA monitoring and control systems. A need has long existed for an integrated system, which uses small PC's to run factory lines, and other large manufacturing facilities.

The integration problems were rampant in the industry. Either, hosts were inadequate or defective. A unique enterprise server was developed to facilitate the integration of software.

a. A need has long exists for a less expensive RTU.
b. A new board has been desired to reduce the costs of RTU by at least 25%.
c. A need has existed for a system, which works faster than traditional host systems.
d. A need has existed for an improved SCADA system and method of communication, which can talk to more systems as host more than traditional systems.

A vital part of any process control system is the initial communication and periodic point-to-point communication of the system, including the process input values, the database, the displays and the like. Such a communication procedure is associated with a SCADA system, which in its most generic definition is essentially a process control system. The components of a typical SCADA system comprise a SCADA device and one or more remotely connected Intelligent Electronic Devices. As used herein, the term SCADA device is used as a convenient shorthand for what may be a collection of electronic equipment, including a computer based controller, which can be a server, also termed the "enterprise server" that is used to remotely monitor communication and/or control the operation of one or more remote RTU's such as relays, meters, transducers and the like. In general, the enterprise server is located miles away from the RTUs presenting many SCADA system communication difficulties. However, such a definition should not preclude an enterprise server being located much closer, even in the same plant as the RTU or RTUs.

Communication for a SCADA system traditionally has been very time and labor intensive. The initial set up of the RTU required an expensive technician to go into the field to configure the RTU. Subsequent maintenance communication has also been particularly time and labor intensive where the RTU is in an extremely remote location, such as on a mountain top or under snow on a pipeline in Alaska with respect to the enterprise server. In such a case, transportation and communication problems have been abundant. Therefore, reducing the time and effort required to run communication of a SCADA system while insuring that the SCADA device database and overall SCADA system operation meets the highest possible accuracy standards can provide substantial cost advantages over current communication procedures.

Traditionally, RTU configuration has involved steps of:
a. Assembling and transporting to the RTU location a collection of complex and expensive test equipment and signal generators that are required to produce the needed configuration.
b. Requiring an expensive technician at the remote location to inject the data into the RTU's inputs.
c. Requiring a second expensive technician at the central location(s) to verify the RTU is correctly processing according to the new configuration.
d. Such a system presents many drawbacks. For example, two technicians at disparate locations are required to perform the service. One of the technicians may be required to travel long distances. Moreover, in most SCADA systems, the RTU can be disconnected from the process that it is monitoring and/or controlling, which may affect the process under control.
e. There is a need for method and apparatus that address the shortcomings of present communication of a SCADA system. These needs are now met by the present invention.

BRIEF DESCRIPTION OF THE DRAWINGS

The detailed description will be better understood in conjunction with the accompanying drawings as follows.

Figure 1:
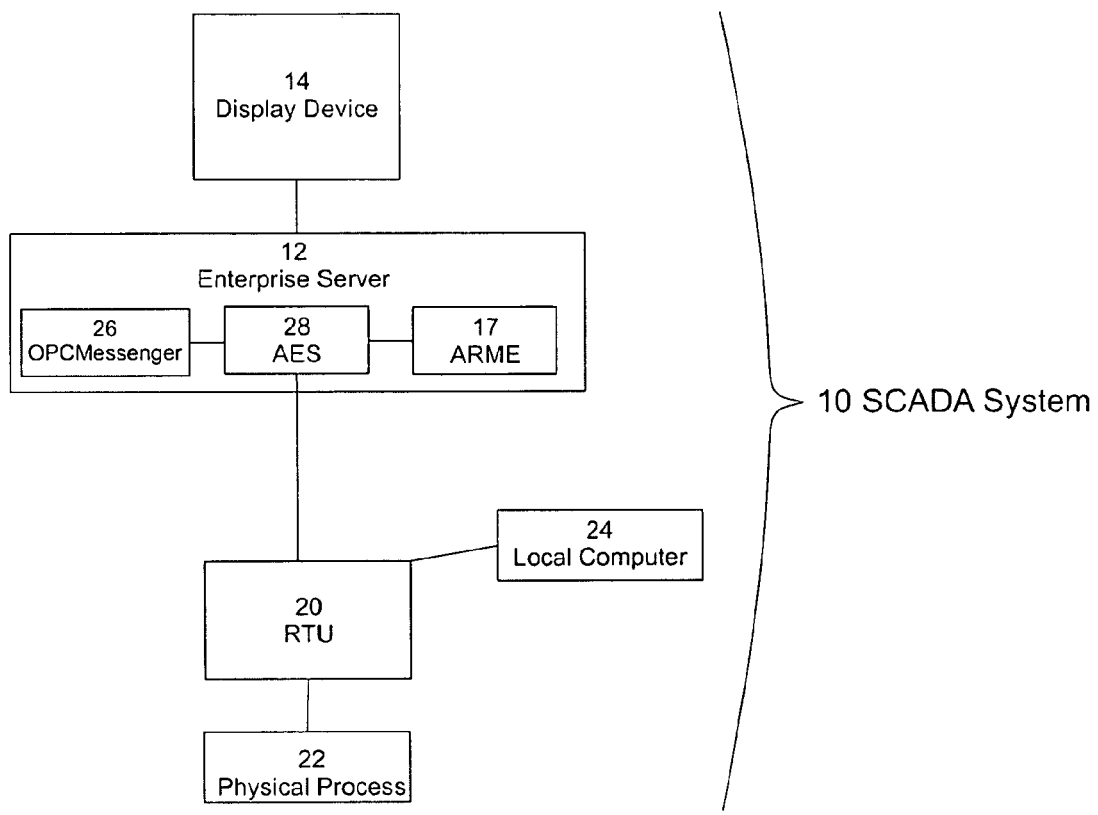
FIG. 1 depicts a SCADA system according to the present invention.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that it can be practiced or carried out in various ways.

The embodiments of the current invention saves lives by insuring the authenticity and privacy of communications over any distance between an communication software (AES) installation and a control devices such as a remote telemetry unit (RTU). Insuring the authenticity and privacy of communications eliminates the possibility that a casual hacker or a terrorist could assume control of potentially hazardous equipment, processes and materials and thereby cause a catastrophic equipment failure or explosion that could result in injury or in loss of life.

The embodiments of the current invention saves the environment by insuring that a hacker inadvertently, or with malicious intent, cannot assume control of potentially hazardous equipment, processes and materials. Inappropriate operation of these assets can result in equipment failures, fires, explosions and leakage of corrosive or carcinogenic chemicals that could result in immediate damage to the surrounding environment but could also have long lasting affects on public health.

The embodiments of the current invention saves energy by insuring that a hacker or terrorist cannot assume control over critical and potentially hazardous assets involved in energy transportation. The inappropriate operation of equipment and processes that transport natural gas through pipelines could result in failures that could allow the release of large amount amounts of natural gas, a valuable energy resource, and could also cause explosions or fire that could result damage to the surrounding environment and potential injury and loss of life.

Adding the security feature to the SCADA system results in the ability to resistant terrorist hacking of RTU and AES communications along pipelines this is very important to energy corridors where terrorist could disrupt major gas or oil supplies. The security also protects against pipe ruptures do to terrorists attacks because the terrorists will not be able to gain knowledge of pipelines contents and movements. The security feature can also prevent industrial espionage by preventing competitors from gaining knowledge of a pipeline.

The use of a security feature is not limited to pipeline data, it can also be used to secure links for water distribution systems of municipalities to insure that the water does not become contaminated. In this example secure communications have assured authenticity and privacy to protecting any utility from critical service disruptions.

The security feature can also be used in hospitals where RTUs are used to monitor MRI's and other patient care, the security feature not only protects patient privacy, but also prevents any corruption of the MRI data and insures robust communication. Additionally the AES/RTU link can be used for service station data associated with an environmental control system to prevent wrongful access.

An embodiment of this invention is a system for communication for a supervisory control and data acquisition (SCADA) system. The SCADA system includes, an enterprise server, and an intelligent electronic device (RTU). The RTU measures a physical process and stores data in memory area for transmission. A communication software (AES) links the enterprise server with the RTU. The SCADA system includes a configuration software (ARME) with which the RTU can be reconfigured.

A configurable security interface can be integrated into the AES, wherein the security interface includes, encrypting data from RTU and AES using an encryption software. The encryption software can be Transport Layer Security (TLS), Secure Socket Layer (SSL). An example of encryption usable in the invention can be model Thales e-Security from Weston, Fla. The encryption software authenticates communications between an authorized RTU and AES and is also available form Thales e-Security. The configurable security interface is adapted to work with a plurality of RTUs and a plurality of encryption software. The configurable security interface is adapted to be activated on line, without interruption of service to the RTUs in communication with the AES.

The configurable security interface operates by embedding a digital signature in the AES, embedding a digital signature in the RTU, initiating AES transmission of the AES digital signature to the RTU and a command to activate RTU security, the RTU validates the AES digital signature by comparing the AES digital signature to a list of recorded AES signatures in the memory of the RTU, if there is a match the RTU encrypts all data from the RTU to the AES using encrypted data.

The SCADA system can communicate a command from the enterprise server to an RTU via the AES to configure the RTU, permit the RTU to receive data input and to store said data, and transmit said data back from the RTU to the AES and the enterprise server.

The RTU can include an analog-to-digital converter (ADC) for measuring the physical process and converting the measurements into a digital representations of the measured values, a memory area for storing digital representations of the measured value. The RTU can also include a processor in communication with said ADC and said memory area, said processor operating upon said digital representation of the measured values according to a predetermined function, and said processor selectively moving said digital representation of the measured values to said memory area.

A command register can be used by the RTU for storing communication commands, said command register being in communication with said processor such that said processor moves said digital representation of the measured values to said memory area when the command register contains an enabling communication command. The bidirectional port can be install in the RTU for communication with the AES and enterprise server for transmitting said digital representation of the measured values to the enterprise server from the RTU via the AES. The bidirectional port can receive digital representations of the measured values from the AES such that said processor reconfigures the RTU. The bidirectional port can be in electrical communication with the AES, in wireless communication with the AES or combinations thereof.

The input or output port can be Ethernet adaptor, a serial communication port, or a modem in communication with the AES and enterprise server for transmitting said digital representation of the measured values from the enterprise server to the RTU via the AES. A watchdog timer can be in communication with the processor for restarting the RTU.

The automation software of the RTU can meter utilities, detect abnormal operating conditions, perform data processing, control operating conditions and combinations thereof. The RTU continues to operate automation software while receiving communication commands and executing reconfiguration commands.

The AES continues communicating with connected RTUs while an additional enterprise server is added or removed from the SCADA system.

Referring now to FIG. 1, there is shown a SCADA system 10 of the present invention. As shown, the SCADA system 10 comprises an enterprise server 12 and has a display device 14 for displaying data to a human operator (not shown in the figure). A second enterprise server (not shown) can optionally be connected to the SCADA system 10 which may have a second display device connected to the second enterprise server.

An RTU 20 such as a microprocessor-based relay, connects to the system. The RTU can monitors and/or control a physical process 22, and an optional local computer 24 can be used for configuring RTU 20 locally.

RTU 20 communicates with enterprise server 12, via a connection called OPC messenger 26. OPC messenger 26 can reside on server 12 as shown in FIG. 1. In another embodiment, the OPC messenger 26 can reside on the local computer 24. In fact, OPC messenger 26, or AES 28 can be on either of the two computers, 12, and 24 shown and there can be less or more than two computers 12 and 24 for the AES 28 to reside on.

Configuration of the RTU 20 occurs by use of a configuration tool ARME 17 which can reside on either of the computers 12, and 24 but is shown on enterprise server 12. The ARME 17 configures the at RTU 20 through the AES 28. The OPC messenger 26 and the ARME 17 can be on their own enterprise servers and separate from the enterprise server the AES 28 is installed on. The OPC messenger 26 and the ARME 17 can still connect to the AES 28 to communicate with the RTU 20

Software termed the "AES" 28 is the communication tool, which can communicate with the RTUs 20.

Generally, in this system, the RTU 20 measures physical properties and monitors status and can measure various physical indicators, such as flow through a pipeline. Additionally, the RTU's can run simulations, and provide data to the enterprise server 12 based on instruction via the AES.

For a simulation, a, SCADA system 10 requires communication with RTU 20 using at least the enterprise server 12, or the computer running the AES others.

The AES provides to RTU 20 with simulation instructions so the RTU can run tests without the need for an operator or expensive test equipment to inject a new configuration of an RTU into system 10. Moreover, RTU 20 can continue to monitor and/or control process 12, while the simulation is running.

Figure 2:
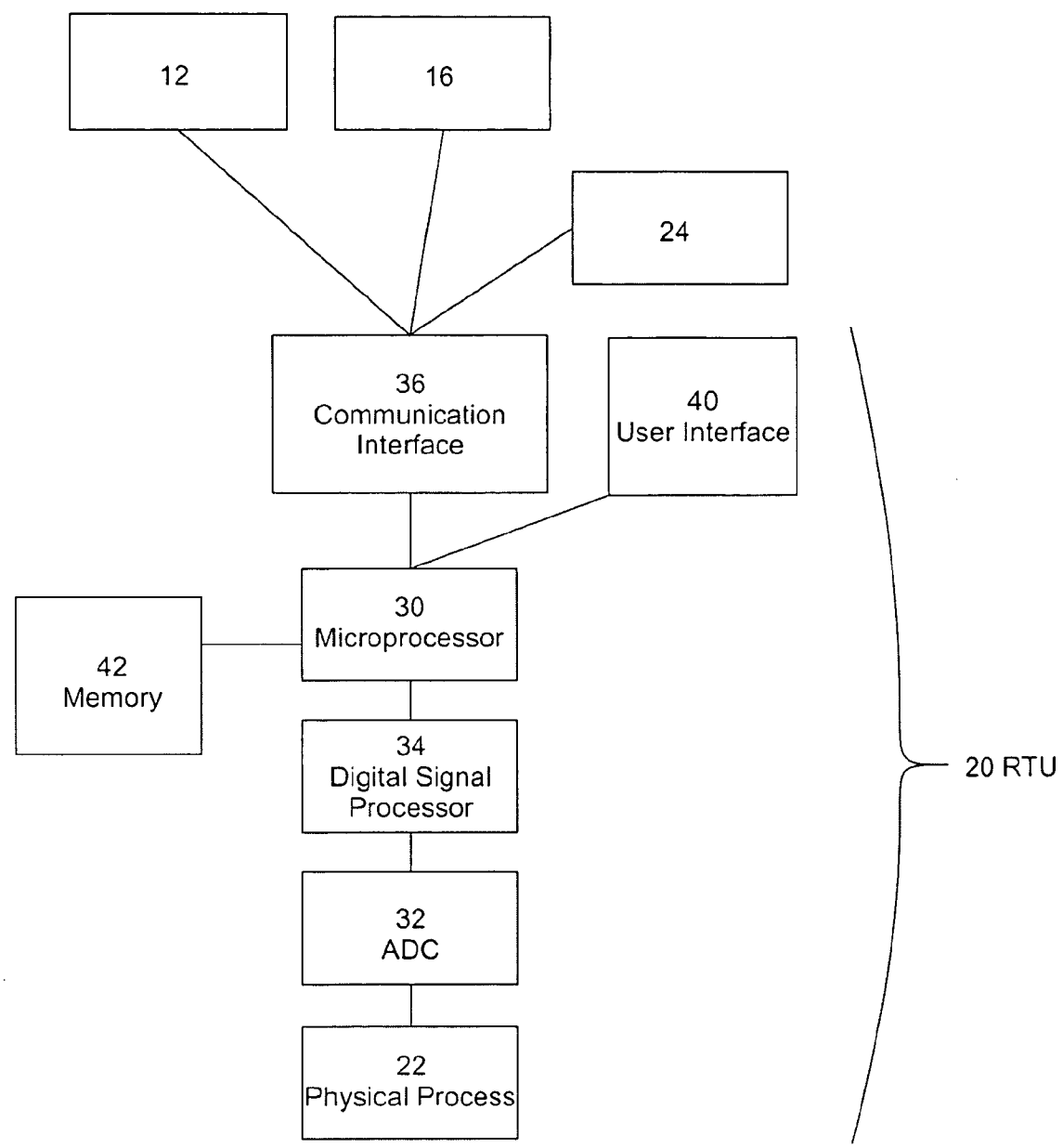
FIG. 2 provides a detail of an RTU of the present invention.

Referring to FIG. 2, an exemplary RTU 20 is shown in further detail. As shown, the essential parts of RTU 20 comprise a microprocessor 30, an analog-to-digital converter (ADC) 32, a digital signal processor 34, a communication interface 36, such as a bi-directional port or one or more directional input ports or output ports. A user interface 40 provides displace and command entry features. The microprocessor 30 has a memory area 42. Memory area 42 can comprise both Read-Only Memory (ROM) and Random Access Memory (RAM). Computers 12, 16, and 24 can connect to the communication interface 36 of the RTU 20.

The input ports can be an Ethernet adapter, a serial communication port, or a modem. The output ports can be an Ethernet adapter, a serial communication port, or a modem.

The watchdog timer can also be used with the SCADA device. The watchdog timer is a relay that is reset during every cycle of the AES software the relay communicates with the processor for restarting the RTU.

As with many standard RTUs such as the microprocessor-based relay, RTU 20 measures aspects of a physical process such as currents and voltages and converts the measured values into a digital equivalent via an analog to digital converter. Microprocessor 30 moves the digital representation of the measured values into memory area 42 where the data can be accessed by programs and external devices such as an enterprise server. Moreover, microprocessor 30 can perform various predetermined functions on the data, such as fault detection as in the case of a relay, or control the process. Microprocessor 30 is also in communication with communication interface 36, the AES so that data (i.e., digital representative data) can be transferred to an external device such as enterprise server 14 or 16 or both, or even more servers.

An input/output interface 36 is coupled to microprocessor 30 and provides binary input signals from a controlling device. Moreover, RTU 20 provides control signals to the controlling device such as a breaker close or open signal if the controlling device is a circuit breaker.

User interface 40 provides a local mechanism for gaining access to the data in memory 42. In this way, a local operator can provide initial configuration data to RTU 20 or check the status of data within memory 42.

Figure 3:
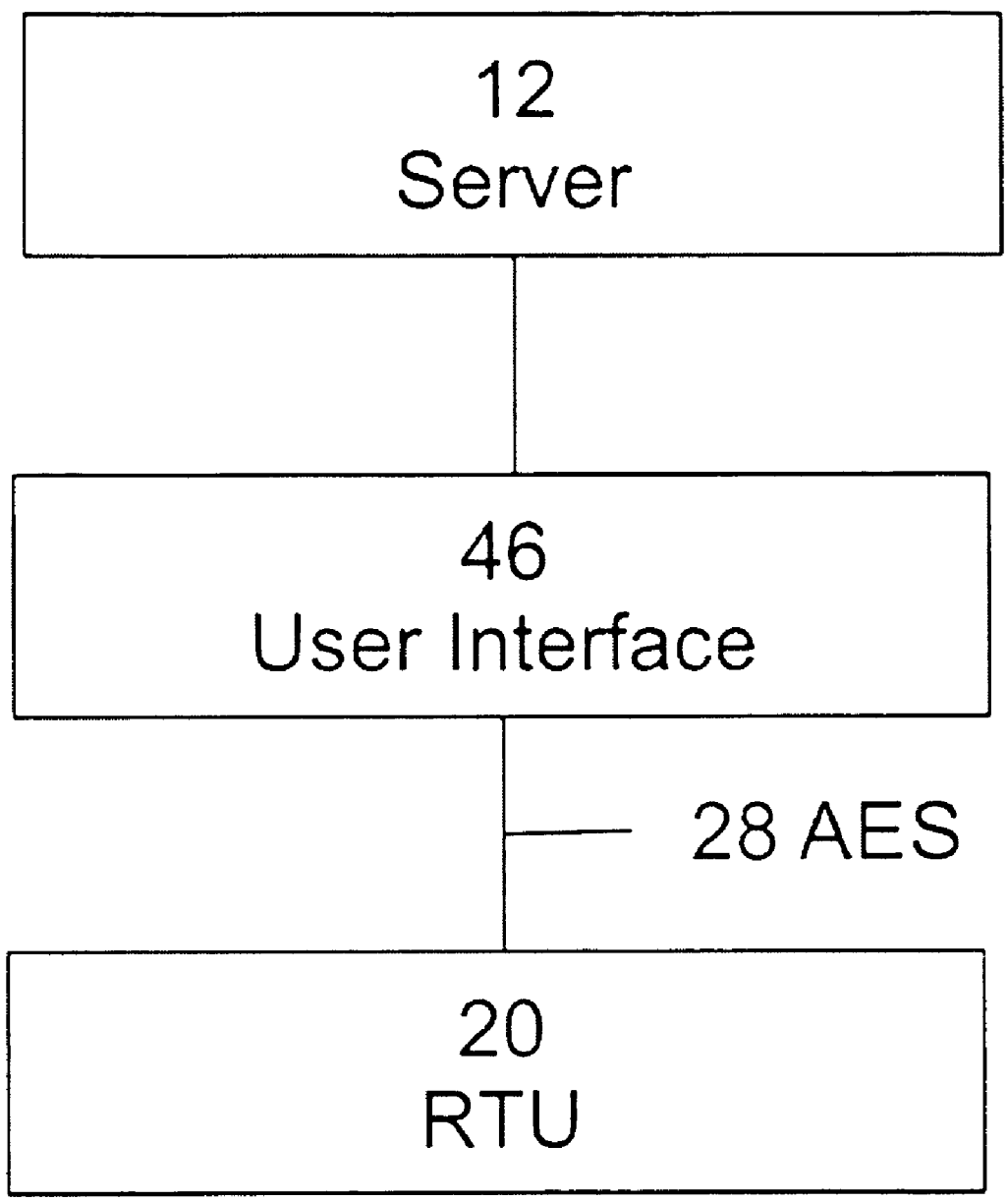
FIG. 3 is a detail of a user interface with an enterprise.

FIG. 3 shows the detail of the reconfiguration process. For reconfiguration while an RTU is on line, a user interface 46 provides input parameters to the RTU via an input device such as a keyboard or a keypad at the server 12 through the AES 28 to the RTU 20. Additionally, interface 46 may display communication data from the RTU allow a user to change the values for the data stored in the RTU. Alternatively, this same user interface 46, can initiate steps to place RTU 20 is in a simulation or test mode.

Significantly, user interface 46 provides another mechanism to command RTU 20 and place RTU 20 either "off line" or into a "sleep mode". Specifically, user interface 46 can be used to remove specific tasks by interval or entirely from the task list initially installed in the RTU. This same interface permits additional tasks to be added to the RTU. If a task is deleted from the RTU, or if the RTU is put into periodic "wake up" mode, the RTU will not store data in memory, or transmit. This feature is particularly useful for a system to be used on long space flights, where the Houston Johnson Space Center needs to only "wake up" certain RTU's at periodic times.

Additionally, user interface 46, which interacts with the AES program 28 permits a user to request internal diagnostics from the RTU to determines the internal status of RTU 20 such as memory failure or processor failure while all other RTU and servers remain on line.

Figure 4:
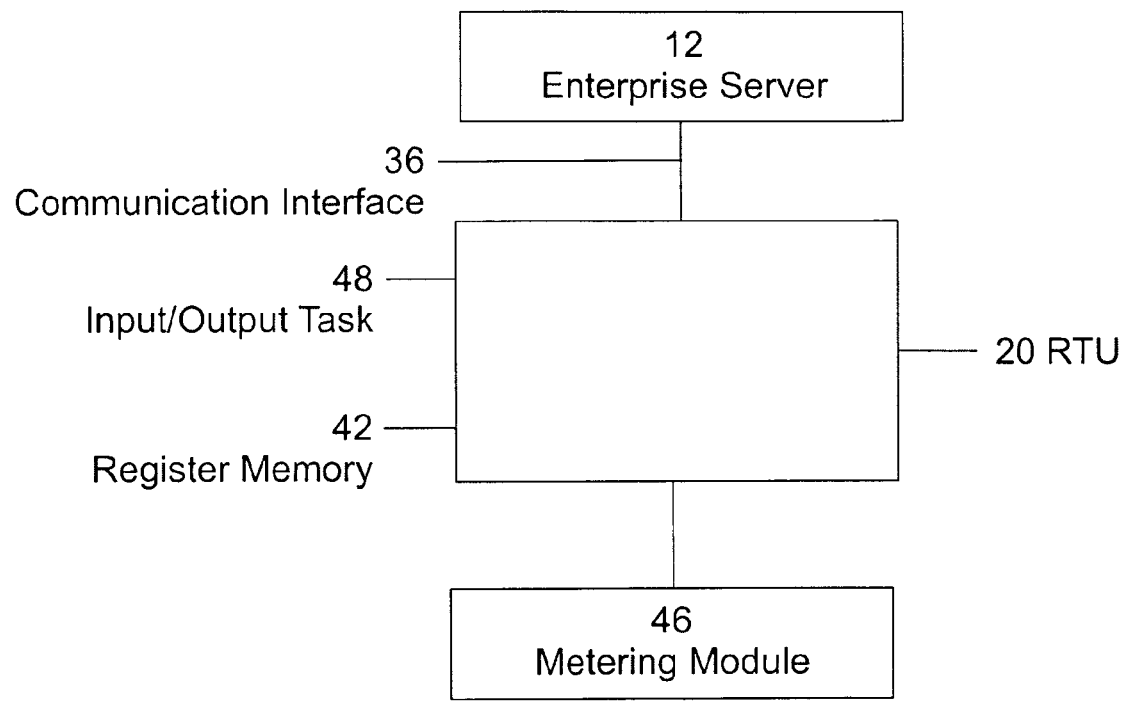
FIG. 4 a diagram of international with external systems.

Referring now to FIG. 4, a flow chart is shown that depicts the interaction of an RTU for metering electricity with a SCADA system of the invention. During normal operation, a metering module 46 writes metered values to register memory 42. Moreover, input/output task 48 writes binary status values to register memory 42. The register memory values written by metering module 46 and input/output task 48 are, then transmitted to the enterprise server 12 for further processing. As described above, the communication port communicates with the AES and controls the interaction between RTU 20 and enterprise server 12. For clarity and brevity, the communication process is described in reference to communication interface 36.

Figure 5:
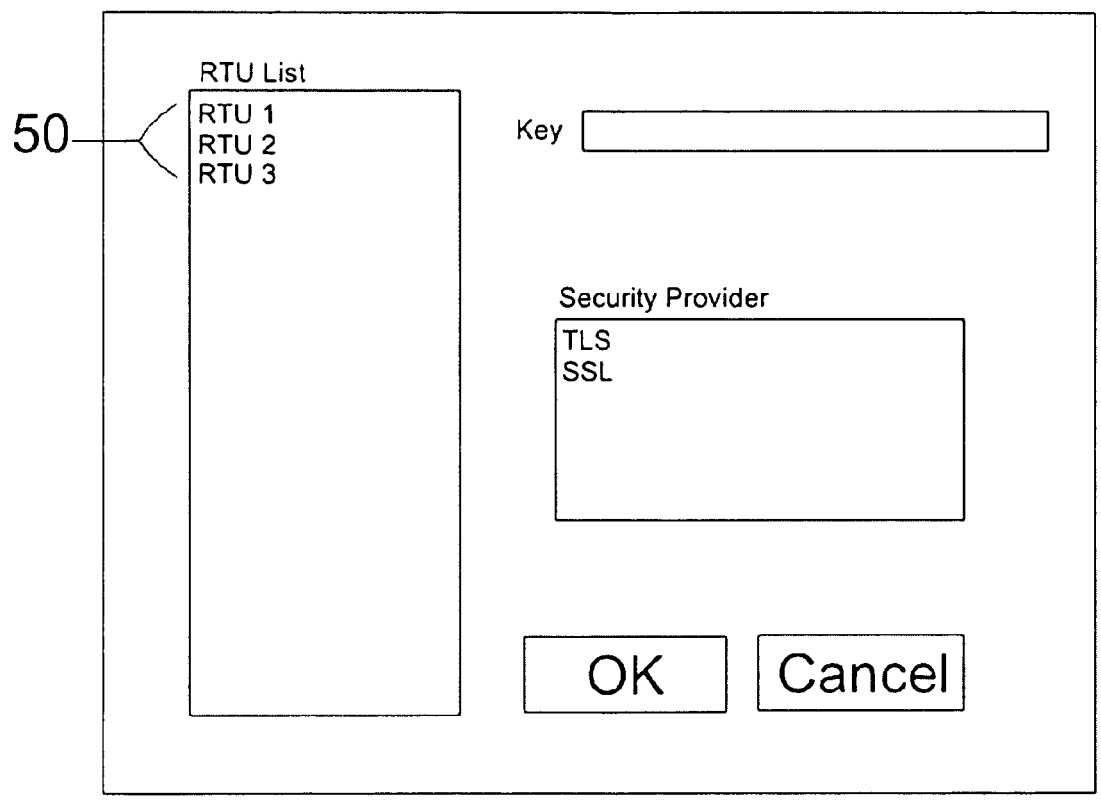
FIG. 5 depicts representation of a screen shot of the security interface according to the invention.

FIG. 5 is a representation of a screen shot of the security setup window. The window will allow a user a simple user friendly way to configure the security between the enterprise server and the RTUs. The RTU List 50 shows the RTUs that are currently connected to the system. The list can also allow specific RTUs to be selected and the selected RTUs security settings to be configured separately from the other RTUs. A security key can also be provided that can be used to create the encryption of the transmissions between the server and the RTU. The a security provider can also be selected on the Security setup window. Some of the options for the security provider are TLS, and SSL but other security providers can be used.

Adding the security feature to the SCADA system results in the ability to resistant terrorist hacking of RTU and AES communications along pipelines this is very important to energy corridors where terrorist could disrupt major gas or oil supplies. The security also protects against pipe ruptures do terrorists attacks because the terrorists will not be able to gain knowledge of pipelines contents and movements. The security feature can also prevent industrial espionage by preventing competitors from gaining knowledge of a pipeline.

The use of a security feature is not limited to pipeline data, it can also be used for secure links for water distribution systems of municipalities, to make sure the water does not get contaminated. It helps protect against water or disruptions of service for any utility.

The security feature can also be used in hospitals where RTUs are used to monitor MRI's and other patient care, the security feature not only protects patient privacy, but also prevents any corruption of the MRI data but also keeps the link sound. Additionally the AES/RTU link can be used to monitor service station data to prevent wrongful access.

During a typical communication sequence (i.e., normal mode) three steps are performed. First, a command is received via communication interface 36 requesting the transmission of data values from memory 42. The data values are then retrieved from memory 42, and prepared for transmission via the AES, for example, properly formatting the data. Finally, the prepared response is transferred to the external device via the AES. An encapsulation layer (GEL) is also used.

The following terms are used here in.
1. The term "SCADA" means Supervisory Control and Data Acquisition Systems.
2. The term "ARME" means the RTU configuration or maintenance tool for the SCADA system. ARME is an OPC Client that communicates through the AES that allows RTU's to be remotely reconfigured after deployment. OPC messenger combines with AES to provide a data acquisition front-end for relational databases.
3. The term "GEL" means Generic Encapsulation Layer.

The invention relates to communication technology which can simultaneously handle multiple types of telemetry and different protocols from various remote terminal units, such as custody control computers for pipes lines, pump off controllers, non-specific controllers, and water meters.

The invention is a server-based system that can provide information to a wide variety of client server interfaces, with the only limitation on capacity being bandwidth and processing power.

The invention works with lease line, radio, public switched telephone networks, cellular phones, and satellite and Internet telemetry reception.

For example, this invention can handle the communication for utility metering for an entire city. Multiple servers of the invention can be used, and the servers can be used in parallel to each other, and enable millions of terminals to receive and transmit communications to a central server and enables the utility to configure millions of RTU's at once.

The invention involves several features, an AES communication tool which has as the new benefits, the security interface as well as the ability to conserve resources within an operating system including, memory, and the number of threads, which can be run through Microsoft NT. This new SCADA system was developed to handle these and other objects, including an ability of the user to assign threads to specific ports to conserve thread.

The AES communication system is capable of handling communication systems with over 100,000 RTU's while continuing non-stop communication with no downtime. The AES component enables the user to add or delete RTU while continuing to operate and function on line. This AES component also enables the user to add additional servers to the AES while the user is on line, without downtime.

The AES, is essentially a windows-based OPC server, (object linking and embedding for process control), which communicates with a plurality of RTU's simultaneously. The present invention relates to a window based communication server that permits digital communication to a field device, and enables the user to digitally connect or disconnect any one or more of the RTU while the system is operating on line. There can be at least 1000 RTU's engageable and disengageable while the system is on line. The system includes hardened computers suitable for performing remote automation in environmentally exposed locations using software compatible with the Windows 98™, NT™ and 2000™ operating systems.

The hardware of the invention is capable of performing remote control, alarm detection, data acquisition, and data management functions. The software provides communication to RTU's via telemetry systems, acquired data management via commercially available databases, such as Oracle, Microsoft Access, Microsoft SQL server, and Cybase and RTU status and performance values and parameters to data centers.

The AES can run as an NT server. AES has:
1. Connection modules, which are connected from a standard port, and include:
   a. TCPIP
   b. Dialup
   c. Serial
   Other modules can be added depending on the hardware interface, such as an ARC NET connection module; and
   Protocol Modules—The Messaging Language
   a. Enron Modbus protocol module
   b. ABB total flow module SCADA system hardware usable in this invention includes a RTU such as the RTU 3000, 4000E or 5000E. These models have different I/O capability, with the 3000 unit being the smallest and only communication ports to meet different application requirements and budgets.

The inventive SCADA system includes:
1. ARME;
2. AES,
   a. Communication Software that is an NT Service
   b. Configuration Software which is an ActiveX Control, and
3. OPC MESSENGER.

The ARME is the RTU configuration or maintenance tool for the SCADA system. ARME is an OPC Client that communicates through the AES that allows RTU's to be remotely reconfigured after deployment. OPC messenger combines with AES to provide a data acquisition front-end for relational databases.

OPC messenger not only is an OPC Client but also has an ODBC interface that is compatible with all leading relational database products.

The ActiveX AES Configuration Software merges with any other software that is an Active X container to allow modification of the AES Communication Software. The AES Configuration Software has specific features that allow the remote configuration of the AES Communication Software, such as over the Internet. The AES Configuration Software provides a set of windows that allows the end user to define the communication desired with the RTU. For example, if a client wants to communicate with a "Total flow" instrument, a window allows the user to set up the connection type, and then set up a virtual port associated with that connection type. A Windows Interface allows the user to select a serial connection type or serial port, and define multiple virtual ports, which are associated with an actual port, such as a COM Port 1. Next, the user selects a protocol, such as Modbus. The user then defines a device, which is to be communicated with via the Modbus protocol. All communication parameters are then selected and then the AES Communication Software is setup for communication with the device through the port.

The AES Configuration Software can modify an offline database where the interface is OLE DB. This feature allows the invention to be compatible with any relational database. When a new device is selected, or new parameters are entered, the changes that are made to the offline database are automatically assimilated by the AES Communication Software.

AES and ARME and OPC MESSENGER run on Microsoft Windows 98™, NT™, or 2000™. The host system (personal computer) requires a minimum of 66 MHz processor speed and a minimum of 16 Megabytes of RAM. A system can be a 500 MHz process with at least 125K of Ram.

The host system's operating environment can be Microsoft Windows 98™, NT™, or 2000™. The invention is compatible with Win32API. The modular design, based on COM Objects, a Microsoft standard, allows the present invention to be extended to support different connection types and protocols.

Communication can be established between a Microsoft Windows base computer and an RTU immediately upon powering the RTU and without RTU configuring or programming.

Automation functionality in the RTU can setup through the following method:
1. Step 1: Select an automation function to be executed in the RTU from the functions available in an ARME program.
2. Step 2. Select additional parameters associated with the specific function.
3. Step 3: Communicate the function from ARME through the AES to the RTU;
4. Step 4: Optionally functions can be added to a function map and portions or all of the function map can be communicated from ARME through the AES to the RTU;
5. Step 5: Optionally functions can be added to a function map and communicated from ARME through AES simultaneously to many RTU's;
6. Step 6: Reconfigures existing RTU's via the AES with new function maps simultaneously.
7. Exemplary function blocks that solve data processing application problems include:
    a. Staging function block,
    b. Analog alarm function block,
    c. Gas metering calculation block,
    d. Digital alarm blocks,
    e. Archive blocks containing historical measurement or data records with date stamps
    f. The ARME consists of function maps.

A library of function blocks that can be included in each map. The ARME has customizable function block ability; enabling end users to self develop and customize function blocks with a VB language. The ARME overwrites a Simulation Environment to simulate a function map in a host computer prior to loading the function map in an RTU. The ARME can download function maps to RTU; upload function maps from RTU's; and synchronize to one or more RTU's with the internal computer clock.

The RTU has a software component termed "the soft RTU" which is loaded on the hardware, the "RTU hardware." The soft RTU has a special operating system, which executes on the function maps, which are downloaded to the RTU.

The hardware interface layer is called the Generic Encapsulation Layer or GEL. This hardware interface contains all the low-level communication programs, which enable the soft RTU to communicate with the Enterprise server. Some of these programs include, timing programs, communication buffers, I/O scanners, memory management, real time clock, power management routines.

To operate the soft RTU, controls in individual function blocks indicate to the operating system of the soft RTU when they should execute. The default configuration of the soft RTU enables immediate communication of the RTU with SCADA system at the moment of power up. Access to all I/O points on the RTU is also granted at the moment of power up.

RTU 4000 of the present invention is designed so that all hardware features can be configures from ARME. This means the user no longer has to have dipswitches, plug in modules, or jumpers. This saves time so that all hardware options with regard to I/O and communication are set in software only. There is only one reason to open the box of the RTU of the invention that is to activate the lithium battery, which is good for at least 10 years.

Features of the novel RTU include the ability of the RTU to put itself to sleep, based on change of status. It can be set to wake up periodically, or be woken up by telephone. It can be put to sleep periodically as well.

The invention contemplates using 8 analog inputs, which can be current, or voltage inputs and the input that are desired, can be picked by the software of the soft RTU.

A multifunction I/O point can be set up as (a) a digital input, a digital output, initializing off, initializing on, a low speed counter and a low speed counter of 0-10 kilohertz, a high speed counter of 125 Kilohertz to 400 kilohertz, a pulse output, a quadracure decoder.

It should be noted that Com Port 1 is always, 232, Com Port 2 and 3, can be RS 232 or RS 235 and be software configurable.

Very little power is required by the RTU when it is asleep. It can be powered for 10 years on the one battery.

In an embodiment, a 12 VDC power supply can power the RTU 4000E. While terminating power supply wires to the RTU be sure to the power supply is off. A 12 VDC power supply or battery can be connected to the (+) 12 VDC terminal and the (−) 12 VDC (The power supply common should be terminated here. After connecting the power supply wires to the RTU, Turn-On the supply. Power-up should be indicated by the 12 VDC pilot light, which can be used as an indicator to check power connections.

Once the RTU is powered the next step is to establish communications between the RTU and can be an Intel computer equipped with Windows 2000™ or Windows NT™. The RTU initially, permits direct wiring of the RTU, however, just after power up with RTU may be configured to communicate via radio, lease line, internet or public telephone, however the following procedure will enable a user to use a default configuration to connect.

For direct communication a standard Null Modem cable should be connected to one of the three RTU 4000EE serial ports (DB9 Male serial connectors) and to COM2, the second serial port on the Intel computer. If COM2 is not available, other COM Ports may be used. To use other COM Ports, attach the serial cable to the desired COM Port's and Configuring Ports.

The AES is compatible with Window 2000™ or Windows NT™. AES supports communication with various RTU's and other vendor products through a computer serial port or network card. Other software packages can communicate with the RTU through AES and its DDE (Dynamic Data Exchange) or OPC (OLE for Process Control) Server interface.

AES is installed by running an SETUP.EXE program as follows:
1. Start Windows 2000™, Windows NT™
2. Insert the distribution diskette into a floppy drive
3. From the Windows Program Manager, invoke the File/Run… command.
4. Enter A:\SETUP (or B:\SETUP.EXE if the diskette is in drive B) and click on the OK or press <ENTER> key. The Setup dialog box will appear:

The RTU 4000E1 is a hardened industrial controller suitable for installation in environmentally exposed locations. The RTU's 32-bit Motorola 68332 processor, 256 Kbytes of battery backed Static RAM and 16 Mbytes of Flash RAM provide strong computing power to perform complex control and data management activities. The RTU 4000E1 has three serial ports that can be used for communication with host computers, pagers, subordinate RTU's, I/O, analyzers and/or other vendor PLC's and RTU's. Lastly, the RTU 4000E1 has 53 I/O points that can be interfaced to instruments and actuators to measure and effect changes to process or equipment status'; and conditions.

When power is initially applied to an RTU 4000E1 the Factory Default; configuration retained in the RTU's flash memory is loaded to static RAM where it is executed. (The active configuration in static RAM is the On-line configuration.) This configuration allows immediate access to the RTU's I/O through the serial ports and the Modbus protocol on power-up. To setup the unit for an automation purpose the user can develop a configuration from a library of Function Blocks embedded in the RTU 4000E1 with the ARME configuration tool. Once loaded, this new configuration replaces the Factory Default and is called the User Default configuration.

The RTU 4000E1 can be packaged with a metal mounting plate and cover. This packaging provides RFI protection but does not provide environmental protection from moisture, dust, corrosive chemicals and atmospheres. In addition, the RTU is not suitable for installation in industrial areas that have a hazardous classification. Additional packaging however, can often meet these requirements.

The RTU 4000E1 has Power Input terminations and Battery Input terminations as shown in FIG. 3. These power inputs are ordered in the RTU power circuitry such that if one source is removed, the RTU will draw from the remaining power source. The Power Input terminations are the primary power source and can accept from 11 to 30 VDC. The Battery Input terminations are intended for a system back-up battery and will accept from 9 to 14 VDC. Circuits associated with the Battery Input will also trickle charge the back-up battery as long as 11 to 30 VDC is applied to the Power Input terminations. Should the Power Input voltage fall below 11 VDC the RTU will automatically draw from the Battery Input power source. When the Power Input voltage returns to a level between 11 and 30 VDC the RTU again draw power from the Power Input terminations and trickle charge the backup battery. When input voltages fall below 9 VDC, a low voltage cutout will protect the RTU from indeterminate states that can occur.

LED indication of the status of power at the Power Input terminations and the Battery Input terminations are provided on the face of the RTU above the Reset button. When power is applied to either the Power Input or the Battery Input terminations the LED will be visible. When power is only applied to the Battery Input the LED will also be visible.

RTU 4000E1 has two grounds, which serve different purposes and can not be connected during the installation process. Transients, radio frequency interference (RFI) and overvoltage protection circuitry in the RTU are designed to transfer these disruptive or destructive signals to earth ground. The protection circuits connect to the mounting plate through mounting pads on the RTU circuit board. The installer should take care to insure that the mounting plate is also connected to a reliable earth ground. In addition the installer should collect all of the shields associated with instrument cables/wiring to RTU I/O at the RTU end and should connect these shields to earth ground.

The digital grounds associated with Digital I/O, Multifunction I/O and Analog I/O is connected within the RTU to Power Input and Battery Input grounds. As indicated in the Power and Battery Backup section above these grounds should be connected to the Common terminal of the power supply and/ or to the Negative Terminal of the Back-up Battery.

An internal lithium back-up battery is provided in the RTU 4000E1 to maintain static RAM and the Real Time Clock when power is removed from the Power Input and Battery Input terminals. Current control set-points or targets, accumulated values and alarm thresholds that are being executed in static RAM may be different from those of the initial configuration maintained in flash RAM. The lithium battery, with a nominal life of 10 years, will maintain all of these settings in static RAM. It is necessary however, to install a jumper on the RTU circuit board to activate the internal back-up battery. To install, remove the RTU cover and locate the jumper next to the lithium battery in the upper right hand corner of the RTU circuit board. Press the jumper on the two pens and replace the RTU cover.

The user can control power consumption in the RTU to a large extent. Under normal operating modes the RTU nominally draws 115 amps at 14 VDC from the Power Input source. This does not include the additional power draws of instrumentation, telemetry hardware or other devices that may be included in an RTU installation. The user can reduce this power consumption by putting the RTU in a sleep mode on an interval or on an event. This capability can be configured through the ARME. In the Sleep Mode the RTU draws 13 mA at 14 VDC from the Power Input Source. Finally, further reductions can be made by selectively or completely deactivating LED indications on the face of the RTU. Again this feature is configured through ARME.

The RTU's are designed to monitor and control assets in environmentally exposed installations and to receive supervision regarding that mission from a remotely located data center. As a result, flexible communication to data center computers is a key capability. The RTU 4000E1 has three serial ports that can be individually configured for Master or Slave communications, different Modbus Slave IDs, communication parameters, hardware handshaking, password protection, privileges, and telemetry methods.

On initial power-up RTU 4000E1 I/O is accessible through any of the three serial communication ports and the Factory Default serial port values. The default settings for the serial ports are given in Table 1 below.

The RTU I/O is also accessible through the Modbus addressing provided in Table 2 below. Note that the address of some points is dependent on the configuration. The address for the default configuration of a particular I/O point is indicated in bold. As indicated in Table 2, all of the I/O in the RTU 4000E1 have pre-assigned Modbus addresses with the exception of the two analog outputs for whom holding addresses are assigned by ARME.

In addition to the default configuration detailed in Table 1, RTU 4000E1 serial ports default to the RS-232 electrical standard. COM Ports 2 and 3 however, can be configured by ARME to support RS-485. FIG. 4 shows the locations of the COM Ports and associated LED's. LED's are provided to indicate the status of serial communication lines. In addition, the indicators located to the left of the Port 2 and 3 LED's; indicate whether these ports are configured for RS-232 or RS-485. The RTU 4000E1, which is a DTE device, is connected to computers and modems through standard serial cables. When connecting to computer serial ports a Null Modem cable should be used. When connecting to a modem or a radio modem a Straight-through cable should be used. Additionally, when communicating through modems that require hardware handshaking the cable will require the RTS, CTS and DCD lines in addition to TX, RX and GND.

In an embodiment, the CPU is a Motorola 68332 16 MHz having 512 KB Static RAM and 4 MB Flash RAM.

The temperature range for operation of the SCADA system can be −40 deg C. to 85 deg C.

The Analog Inputs Software are Selectable 0 to 5 VDC or 4 to 20 ma

The Analog Output Software Selectable 0 to 5 VDC or 4 to 20 ma.

The Multifunction I/O's can be configured in the software as:
1. Digital Inputs (DI),
2. Digital Outputs (DO),
3. Low Speed Counters/Accumulator (LSC),
4. High Speed Counters (HSC),
5. Pulse Outputs (PO),
6. Quadrature Decoder (QD), or
7. Pulse Width Modulation (PWM).
8. DI Mode—5/12/24 VDC Sink
9. DO Mode—5/12/24 VDC Sink
10. HSC Mode—125 Hz to 100KHZ @ 5 DC to 36 VDC
11. LSC Mode—0 Hz to 10 kHz @ 5 VDC to 36 VDC
12. PO Mode 125 Hz to 100 kHz @ 5 VDC
13. PWM Mode 125 Hz to 100 kHz Duty Cycle Add-on modules can convert any of these 11 points to additional Analog Inputs, Thermocouples Inputs, RTD Inputs, or Analog Outputs.

There are 32 Digital Points in the software and include:
1. Digital Inputs (DI) 5/12/24 VDC Sink
2. Digital Outputs (DO) 5/12/24 VDC Sink
3. LED indication for all Digital Points
4. Transient Protection
5. Compliant with IEEE 472 and ANSI 37.90.

The Serial Communication Ports can be:
1. Port 1 EIA-232, full handshaking, DB-9 Male.
2. Port 2 EIA-232/485, software selectable, full handshaking, DB-9 Male.
3. Port 3 EIA-232/485, software selectable, full handshaking, DB-9 Male.
4. LED indication of Port 2/3 EIA-485 mode.
5. LED indication of DTR, TX, RX, DCD, RTS, and CTS for each port.

The Power Supply can be set with:
1. Three power modes: Un-powered, Sleep, Operational
2. Primary Power Input
3. Power Requirement 11-30 VDC
4. Operational Mode: Minimum power draw is 115 amps @ 14 VDC plus @ 1.8 amps/LED
5. Sleep Mode: Minimum power draw is 13 amps @ 14 VDC
6. LED indication when powered by Primary Power source
7. Back-up Battery Input
8. Power Requirement 9-30 VDC In the Operational Mode, the minimum power draw is 102 amps @ 12 VDC plus @ 1.8 amps/LED In the Sleep Mode:
1. The RTU is configured to enter Sleep mode by software logic.
2. The RTU awakens upon:
   a. Return of power
   b. Alarm Clock setting
   c. Modem ring indication The overall dimension of the RTU can be 6.14 W×11.5 L×1.35 H with mounting plate.

The firmware of the RTU's control, data acquisition, alarm and event, and data logging capabilities are configured with the RTU Maintenance Environment (ARME). In addition all hardware options are configured from ARME. No hardware jumpers, switches or plug-ins are required.

The RTU 4000E supports the Modbus protocol standard, and can monitor 17 million RTU Addresses, provide:
1. Exception Reporting
2. Scatter Reads (Registers do not have to be contiguous.)
3. Mixed Data Type Messaging, and
4. Security/Access privileges configurable per port, which are
   a. Read Only
   b. Read/Write, or
   c. Read/Write/Configure.

The master protocols supported by the invention include:
1. Modbus ASCII and RTU
2. Daniels Modbus ASCII and RTU
3. Enron Modbus
4. Rosemount 3095 Modbus
5. Extended Modbus
6. Yokagawa Power Quality Monitor Slave protocols supported include:
1. Modbus ASCII and RTU,
2. Daniels Modbus ASCII and RTU,
3. Enron Modbus,
4. Extended Modbus.

For Data Acquisition, on power-up all RTU I/O is accessible via EIA-232 and Modbus addressing, no programming required. In addition,
1. Data archival sampling rates are configurable from seconds to hours.
2. RTU flash RAM that is available for data archival can store 365 days of hourly data for 24 points. Over 250,000 records available for storage.

The invention allows up to 100 function blocks can be configured to address control, data acquisition, data logging or alarm applications. The function blocks can be:
1. Accumulator/Totalizer Block
2. AGA Block Compressible Fluid
3. Incompressible Fluid
4. AGA 3
5. AGA 8 Detailed
6. AGA 8 Gross 1
7. AGA 8 Gross 2
8. AGA 7
9. Alternate Block
10. Analog Alarm Block
11. Analog Input Block
12. Archive Block
13. Boolean/Math Block
14. Cryout Block
15. Digital Alarm Block
16. LCD Block
17. Mapping Block
18. Momentary Block
19. On/Off Control Block
20. PID Control Block
21. Scale Block
22. Staging Block
23. Sleep Block
24. Stop Watch Block
25. System Block
26. Timer BlockValve Block
27. User definable Function Blocks via Soft RTU Toolkit The Enterprise Server includes:
1. On-line configuration supports non-stop communication with field devices.
2. Communication Server runs as a Service in Windows NT 4.0 and 2000.
3. Communication support includes,
4. Real-time data polling,
5. Archival data uploads from field devices, and
6. Exception reports or Cryouts from field devices.
7. Configuration tools are ActiveX controls that can be run in an OLE
8. Container Compliant HMI or Browser.
9. Remote Administration Supported.

10. Embedded diagnostics logs performance information and forensics data to
11. ASI Viewer and/or Log File.
12. Most communication functions and controls are accessible to external applications through the OPC Server interface.
13. Embedded Client triggers,
14. Enables real-time data caching for OPC Client applications.
15. Automatic archived data uploads from field devices without OPC Client application.
16. Item aliases supported for protocol independent HMI/Client Application development.
17. Browsing supports protocol specific data types/items and Aliases.
18. Multiple protocols can be supported on a single communication channel.

Telemetry methods, which are usable in this invention, include:
1. Serial Cable, Leased-line or Serial Multi-drop,
2. PSTN and PPP via Modem,
3. Radio (Conventional, Trunking, and Spread-Spectrum Radio),
4. VSAT,
5. TCP/IP Ethernet, TCP/IP Ethernet Terminal Servers, and IP.

Protocols Modules include:
1. Modbus Module
2. Modbus RTU and ASCII
3. Omni 3000/6000 Modbus (Real-time Data, and History and Report Uploads)
4. Daniels Modbus RTU and ASCII (Real-time Data and History Uploads)
5. Enron Modbus (Real-time Data and History Uploads)
6. Flow Automation Modbus (Real-time Data and History Uploads)
7. ABB TotalFlow Modbus (Real-time Data and History Uploads)
8. Motorola MOSCAD Modbus
9. Delta X Modbus (Real-time Data and Dynagraph Cards)
10. Baker CAC Modbus (Real-Time Data and Dynagraph Cards)
11. Bristol Babcock BSAP Module
12. ABB TotalFlow Packet (Native) Protocol Module (Real-time Data and History Uploads)
13. ABB HCI-A Module (AAI Analyzers)
14. Allen Bradley DF1 Module:
    a. Master-Slave (Half Duplex)
    b. Point-To-Point (Full Duplex)
15. Fisher ROC Module (ROC 300 Series, FloBoss 407, 500 Series) (Real-time Data and History Uploads)
16. GE SNP Module
17. GE 90 Series PLC Ethernet Module
18. HP48000 Module (Real-time Data and History Uploads)
19. Cutler Hammer—IMPACC System Communications Module
20. Detroit Diesel DDEC Module (Detroit Diesel Electronic Controller)
21. General Motors EMD MDEC Module (Marine Diesel Electronic Controller)
22. Caterpillar ECM Module (Electronic Controller Module)
23. Nautronix ASK Module
24. Mercury ECAT, ER Module (Real-time Data and History Uploads)
25. Teledyne CA, TGP Module Server Interface Formats include:
1. OPC (OLETM for Process Control)
2. Microsoft CF_TEXT, XlTable
3. Rockwell Software AdvanceDDETM
4. Wonderware FastDDETM The types of communication transactions include:
1. Real-time Data
2. Interval Polling at 15 different intervals (Periodic Timer Triggered)
3. Slow Polls at 15 Intervals are a percentage of Polling Interval (Faster and Slower rates are supported.)
4. Synchronous Polling (Clock or Calendar Triggered)
5. Demand Polling (DDE/OPC Client Triggered)
6. History/Archived data Uploads
7. Interval Uploads at 15 different intervals (Periodic Timer Triggered)
8. Slow Uploads at 15 Intervals are a percentage of Polling Interval (Faster and Slower rates are supported.)
9. Synchronous Uploads (Clock or Calendar Triggered)

The AES can communication without an OPC request from an external Client. It provides more deterministic performances as real-time data items are constantly active. The data collected is cached for delivered to external Client applications via the Server interface. Provides standalone history/archived data uploads from field devices for storage in database or audit files without the requirement of an external Client.

Documentation and Configuration, the invention permits the following:
1. OLE DB interface support for all leading relational databases.
2. Database driven external configuration tools to ease maintenance of large applications.
3. Database driven reports to document AES configuration.
4. Database tools to support simultaneous configuration of HMI/Client Application and AES.
5. SCADA Capabilities, this invention allows:
    a. Client access to communication diagnostics for each telemetry channel and for each RTU/PLC.
    b. One AES installation to support multiple protocols.
    c. Multiple protocols can be supported over one communication channel.
    d. Client-Server interface to give a Client full control of all aspects of the server including:
        (1) Polling Interval
        (2) Demand Polling
        (3) Telephone number for dial-up
    e. AES redundant devices: RTU/PLCs.
    f. Automatic fail-over to back-up device
    g. AES supports redundant telemetry channels/methods to a single device:
    h. Data Logging:
        (1) Uploaded data can be logged to any leading database via OLE DB.
        (2) EFM data uploads can be written to Flow Cal files or to Flow Cal Enterprise (Oracle) format.
        (3) User defined periodic file closing: file size control
        (4) User defined path to file location
        (5) User defined directory and file labels identify file content, date and time.
        (6) User defined automatic file purging: directory size control
    i. Diagnostic Logging:
        (1) AES logs diagnostic and forensic data to an ASI Viewer and/or Log file.
        (2) Data that can be activated for Diagnostic Logging includes the following.
    j. Message Errors
    k. Send Messages l. Receive Messages
m. Device and Item Activity
n. Status Changes
o. Client Data Received
p. Field Device Data Received
q. Event Notification from Ports
r. Receive Buffer Contents and Data
s. Item Name, Value and Quality
t. Changes in Client Status
u. Changes in AES Configuration
v. Data Flow Between AES Components
w. Performance Data regarding Threads
x. AES Footprint or Tracing Information The invention has as features:
1. Control, alarm monitoring, data logging, data acquisition, and communication functions of the embedded SoftRTU are implemented using ARME.
2. Data acquisition immediately on power-up without configuring or programming.
3. A fill-in-the-blank configuration interface that is used to setup RTU functions without programming.
4. Ability to reconfigure RTU's while they are on-line.
5. Loading of new configurations over the telemetry system.
6. Loading of RTU configurations to be uploaded and modified for downloading to other RTU's.
7. Configuration to archive data for periods greater than one year to nonvolatile memory.
8. Synchronization utilities between the RTU and the host computer.

This SCADA system can be used for:
1. Electrical Power Quality Monitoring
2. Electronic Flow Measurement (EFM)
3. Compressor Control
4. Wastewater Collection and Water Distribution Systems
5. Pump Control
6. Pipeline Valve Control
7. Surveillance
8. Environmental Monitoring
9. Traffic Control
10. Safety and Early Warning Systems Connection features are as follows:
1. Connection (OPC MESSENGER) is a data logger that has a DDE/OPC Client Interface.
2. OPC MESSENGER can acquire data from any DDE, OPC or ODBC source, and store the data via ODBC to any compliant database.
3. OPC MESSENGER can also retrieve data from the database and write the data to an RTU or PLC via the DDE/OPC Server.
4. Data is acquired on an Interval, External Trigger, Change in Value or Change of State, and synchronous with the clock.
5. Multiple logging or retrieval plans, called Schemes, can be configured to transfer data periodically or on event for various business, engineering, or research purposes. Each logging Scheme subsequently writes the data to its specific database file format or to a file.
6. OPC MESSENGER also has a Watch-Dog-Timer to insure data is not lost during a network failure or due to the loss of a network storage device. Data is logged to the secondary path on failure of the Watch-Dog-Timer.
7. The intervals at which OPC MESSENGER log files are closed are configurable for each Scheme.
8. The interval at which the directory for OPC MESSENGER log files is purged is configurable for each Scheme.
9. DDE formats supported include Microsoft formats and Advanced DDE.
10. OPC MESSENGER is especially suited for uploading time-stamped data from intelligent data acquisition and control systems.
11. OPC MESSENGER runs on Windows 2000™ and Windows NT™.

While these embodiments have been described with emphasis on the embodiments, it should be understood that within the scope of the appended claims, the embodiments might be practiced other than as specifically described herein.

What is claimed is:

1. A system for communication for a supervisory control and data acquisition (SCADA) system, the SCADA system comprising:
  (a) an enterprise server;
  (b) an intelligent electronic device (RTU), wherein the RTU measures a physical process and stores data in a memory area for transmission;
  (c) a communication software (AES) linking the enterprise server with the RTU;
  (d) a configuration software (ARME) with which the RTU can be reconfigured;
  (e) a configurable security interface integrated into the AES, wherein the configurable security interface comprises, an encryption software, wherein the encryption software:
    i. encrypts data transmitted from the AES to RTU using the encryption software,
    ii. decrypts data received from the RTU by the AES using the encryption software,
    iii. authenticates that the RTU is authorized to transmit to the AES, and
    iv. authenticates that the AES is authorized to transmit to the RTU; and
  (f) the SCADA system is configured to:
    i. communicate a command from the enterprise server to the RTU via the AES, where in the command comprises:
      1. an ARME command to configure the RTU, or
      2. an OPCMessanger command requesting the data from the RTU, wherein the data is stored,
    ii. communicate a command from the RTU to the AES; wherein the command comprises,
      1. the data, or
      2. a request of the AES for further instructions,
    iii. permit the RTU to receive the data input and to store the data, and
    iv. transmit the data back from the RTU to the AES and the enterprise server.

2. The system of claim 1, wherein the configurable security interface is configured to work with a plurality of RTUs.

3. The system of claim 1, wherein the configurable security interface is configured to be activated on line, without interruption of service to the RTUs in communication with the AES.

4. The system of claim 1, wherein the configurable security interface operates by embedding a digital signature in the AES, embedding a digital signature in the RTU, initiating AES transmission of the AES digital signature to the RTU and a command to activate RTU security, the RTU validates the AES digital signature by comparing the AES digital signature to a list of recorded AES signatures in the memory of the RTU, if there is a match the RTU encrypts all data from the RTU to the AES using encrypted data.

5. The system of claim 1, wherein the RTU comprises:
  (a) an analog-to-digital converter (ADC) for measuring the physical process and converting the measurements into a digital representations of the measured values;

(b) a memory area for storing digital representations of the measured value;
(c) processor in communication with said ADC and said memory area, said processor operating upon said digital representation of the measured values according to a predetermined function, and said processor selectively moving said digital representation of the measured values to said memory area;
(d) a command register for storing communication commands, said command register being in communication with said processor such that said processor moves said digital representation of the measured values to said memory area when the command register contains an enabling communication command;
(e) bidirectional port in communication with the AES and enterprise server for transmitting said digital representation of the measured values to the enterprise server from the RTU via the AES; and
(f) wherein said bidirectional port receives digital representation of the measured values from the AES such that said processor reconfigures the RTU.

6. The system of claim 5, wherein said bidirectional port is in electrical communication with the AES, in wireless communication with the AES or combinations thereof.

7. The system of claim 5, wherein automation software of said RTU can perform at least one of the activities: meter utilities, detect abnormal operating conditions, perform data processing, control operating conditions and combinations thereof.

8. The system of claim 1, wherein said RTU comprises:
(a) an analog-to-digital converter (ADC) for measuring the physical process and converting the measurements into a digital representations of the measured values;
(b) a memory area for storing digital representations of the measured value;
(c) a processor in communication with said ADC and said memory area, said processor operating upon said digital representation of the measured values according to a predetermined function, and said processor selectively moving said digital representation of the measured values to said memory area;
(d) a command register for storing communication commands, said command register being in communication with said processor such that said processor moves said digital representation of the measured values to said memory area when the command register contains an enabling communication command;
(e) an input port selected from the group: an Ethernet adaptor, a serial communication port, or a modem in communication with the AES and enterprise server for transmitting said digital representation of the measured values from the enterprise server to the RTU via the AES and wherein said processor reconfigures the RTU;
(f) an output port selected from the group: an Ethernet adaptor, a serial communication port, or a modem, in communication with the AES and enterprise server for transmitting digital representation of the measured values from the RTU via the AES to the enterprise server; and
(g) a watchdog timer in communication with the processor for restarting the RTU.

9. The system of claim 8, wherein said input port, output port, or combination thereof is in electrical communication with the AES, wireless communication with the AES or combinations thereof.

10. The system of claim 8, wherein automation software of said RTU can perform at least one of the activities: meter utilities, detect abnormal operating conditions, perform data processing and control operating conditions.

11. The system of 1, wherein said RTU continues to operate automation software while receiving communication commands and executing reconfiguration commands.

12. The system of claim 1, wherein said AES continues communicating with connected RTUs while an additional enterprise server is added to the SCADA system, removed from the SCADA system or combinations thereof.

13. The system of claim 1, wherein said AES continues communicating with connected RTUs while an additional RTU is added to the system, deleting an RTU from the system, or combinations thereof.

14. The system of claim 1, wherein the security interface allows encryption software modules to be activated or deactivated from the security interface.

15. The system of claim 14, wherein the RTU continues to communicate with the AES while activating or deactivating of the encryption software modules.

16. The system of claim 1, wherein the security interface allows encryption software modules to be added or removed from the security interface.

17. The system of claim 14, wherein encryption software modules use public key encryption, symmetrical encryption, or combinations thereof.

18. The system of claim 1, further comprising a log, wherein the log stores information from the security interface.

19. The system of claim 1, wherein the encryption software of the RTU can be changed.

20. The system of claim 19, wherein the encryption software of the RTU can be changed while the RTU is online.

* * * * *